US005832806A

United States Patent [19]
Nelson

[11] Patent Number: 5,832,806
[45] Date of Patent: Nov. 10, 1998

[54] NON-CONTACTING PRECISION ELECTRONIC CONTROL SERVO FOR PNEUMATIC ISOLATORS

[75] Inventor: Peter G. Nelson, Newburyport, Mass.

[73] Assignee: Technical Manufacturing Corporation, Peabody, Mass.

[21] Appl. No.: 679,179

[22] Filed: Jul. 12, 1996

[51] Int. Cl.[6] .................................................. F15B 13/16
[52] U.S. Cl. ................................. 91/361; 91/364; 91/366; 91/393; 91/459; 248/550
[58] Field of Search .................... 91/361, 392, 393, 91/364, 366, 389, 459, 508, 519, 534; 248/550

[56] References Cited

U.S. PATENT DOCUMENTS

| Re. 33,937 | 5/1992 | Schubert | 267/136 |
|---|---|---|---|
| 4,757,746 | 7/1988 | Ginzburg | 91/361 |
| 4,850,261 | 7/1989 | Greene | 91/362 |
| 5,060,519 | 10/1991 | Chojitani et al. | 248/550 X |
| 5,285,995 | 2/1994 | Gonzalez et al. | 248/550 |
| 5,478,043 | 12/1995 | Wakui | 248/550 |

*Primary Examiner*—Hoang Nguyen
*Attorney, Agent, or Firm*—Samuels, Gauthier, Stevens & Reppert

[57] ABSTRACT

A positioning system uses a position feedback signal to position and damp a platform. The position feedback signal is input to an electronic controller that provides a plurality of control signal that are used to position the platform and dampen the platform motion.

23 Claims, 9 Drawing Sheets

NON-CONTACTING PRECISION ELECTRONIC CONTROL SERVO FOR PNEUMATIC ISOLATORS

FIELD OF THE INVENTION

A pre electronic positioning system for pneumatic isolators used with vibration isolation tables.

BACKGROUND AND BRIEF SUMMARY OF THE INVENTION

Vibration isolation tables are used to support sensitive instrumentation. In a vibration isolation table a table top or platform is supported by a vibration isolation system. The system comprises pneumatic isolators, sensors, pneumatic controls and structural supports. These pneumatic isolators are "air springs" in a general sense in that they utilize the compressibility of air contained in a chamber, a flexible sealing element and a load. bearing piston to produce the characteristics of a low frequency spring, i.e. a soft suspension for the object supported. Unlike metal springs and shock cords they can be made to accommodate a varying load without major deflection by varying the air pressure and thus the lift (force) in the air chamber.

To maintain and control the position of the platform (supported mass) sensor systems are integrated with the platform and the pneumatic isolators. Air control valves typically form part of the sensing systems and are designed to possess the required degree of sensitivity for effective operation.

After the platform has come to equilibrium in a vibration isolation system, the positioning of the platform is controlled by the sensing/valving system. Generally, in prior art systems a mechanical linkage is provided between the earth and the platform via an arm which contacts the platform. The arm forms a linkage with a valve which controls the air flow into and out of the isolator.

Vibrations can be transmitted through this linkage. The mechanical contacting valves can also stiffen the platform suspension, and likewise degrade the isolation of the platform.

Prior art systems provide good positioning ability, however they are slow to respond to changes in the payload and the isolator's damping characteristics are not superior.

U.S. Pat. No. 4,850,261 (Greene) teaches the use of pulse-width-modulated (PWM) ON-OFF valves to control the air flow to minimize the 'dead band'. However, this system introduced pulse noise into the system and also limited the life of the valves due to their continuous switching. The present invention, as will be described, uses analog proportional valves, which produce no such noise and have a life span which is significantly longer than in a PWM system. The '261 patent teaches the use of three non-contacting sensors to measure height and additional level transducers to measure pitch and roll. The present invention uses three sensors which completely describe the height, pitch and roll of the platform.

U.S. Pat. No. 5,285,995 (Gonzalez) is based on the '261 system and teaches a magnetic leveling system.

U.S. Pat. Re. 33,937 (Schubert) teaches a system which uses proportional valves and some damping electronics. However, the '937 system uses contacting sensors which provide a path for mechanical noise to reach the platform and its payload.

The present invention eliminates the mechanical coupling, significantly improves the leveling and tilt accuracy over conventional systems, has a faster response time than prior art systems (2 to 10 times faster) and improves the damping of the pneumatic isolators when compared with either mechanical or electronic valving systems.

The sensor(s) of the system need not engage the supported load. That is, there need be no mechanical correspondence between the supported load and the sensor. A signal from the sensor, preferably a non-contacting sensor, is conditioned and activates a valve which controls the flow of air into and out of a pneumatic isolator. The dead band inherent in the state of the art systems is essentially eliminated.

Broadly the invention comprises a positioning system for use with pneumatic isolators which isolators support and position a platform. Valves are in communication with the pneumatic isolators and at least three sensors are in communication with the platform. The sensors provide output signals corresponding to the position of the platform. The output signals from the sensors are processed to provide three position signals, which three position signals define the height, pitch and roll of the platform. These signals are conditioned to provide signals which are proportional and opposite to the displacement of the platform. The conditioned signals are further processed to provide output signals to the valves associated with the pneumatic isolators. This brings the platform to or maintains the platform in a null position with regard to its height, pitch and roll. In a particularly preferred embodiment of the invention the signals from the sensors are initially paired with one another to form specifically a height signal, a pitch signal and a roll signal. After the signals are processed into height, pitch and roll, they are further processed to implement the damping, load-independent leveling, and feed-forward features.

In another embodiment of the invention, the system provides electronic damping based on the proximity sensors. A filter in combination with each of three servo branches (height, pitch and roll) double-differentiates the feedback signal in the frequency region of the platform's resonance. This allows the feedback gain to be increased (compared with previous electronic systems), giving both faster leveling response and improved damping characteristics.

In still another embodiment of the invention, inertial sensors (geophones) are used for the damping function. In this embodiment, the electronic damping just described is shut off and the geophone filter circuits turned on. In both modes of electronic damping the position signals are processed to provide signals proportional and opposite to the velocity of the platform.

In a particularly preferred embodiment of the invention, there is also a significant improvement in the linearity of the damping of the system when the pneumatic isolators are configured with a single chamber. In passive prior art pneumatic isolators, the air volume constituting the 'air' spring is divided into two chambers, and an orifice is added between them to provide damping. The damping of the table in such systems is provided by the resistance of air to flow through this orifice. This resistance, however, is highly non-linear, and typically reduces for small air flows (corresponding to small payload or earth disturbances). This means that at very low amplitudes, the effect of the orifice is greatly reduced, resulting in large amplifications of disturbances at the resonant frequency of the platform (characteristic of under-damped systems).

In the present invention, a single chamber is used without a prior art damping orifice. The damping is linear for all but the largest disturbances to the platform and is very linear for small amplitude disturbances. Thus the system of the invention does not exhibit the small-amplitude increase in amplification of noise at resonance inherent in passive damping schemes. The absence of a damping orifice allows the controller to move air more rapidly into and out of the pneumatic isolators, providing an improved damping characteristic which is independent of the amplitude of the platform's motion.

In still another embodiment, the system of the invention includes electronic integrators. This allows the system to reproduce its height and tilt to within sub-micron/microradian height and tilt stability and repeatability, independent of changes in the total payload mass or its distribution on the platform. Further the electronic integrators do not engage until the platform pneumatic isolators are fully inflated, thus reducing any hunt and seek of the platform when the system is cold started.

In another embodiment of the invention, the system is capable of providing full feed-forward inputs. This allows the system to anticipate payload motions and to effect the needed pressure corrections minimizing platform motion, and reducing platform settling times. The feed forward inputs, when used, also allow simplified docking of stages, such as in inspection machines, and allows for electronic control of a platform's alignment with other equipment or tables.

In the preferred embodiment of the invention, the system uses a set of three eddy-current-based 'namur' proximity sensors. These sensors are located at three of the four corners of the platform being isolated. Where the table rests on four legs, then two legs are 'tied' together and operated from a common valve. From the three sensors, information about the platform's height and two tilts (pitch and roll) are derived. This information is then sent to a controller which controls three proportional servo valves. In, addition to the valves feeding air into each leg (or leg pair), there is an orifice on each leg which continually bleeds air off from the leg(s). When the valve-controlled inlet flow matches the air bleedoff, then the system is in equilibrium. The servo valves either increase or decrease their flow to inflate or deflate the legs respectively.

DESCRIPTION OF THE PREFERRED EMBODIMENT(S)

The system of the invention can be adapted for several modes of operation. The system can be used with any pneumatically isolated platform such as is commonly used in coordinate measuring machines (CMM) and semiconductor manufacturing equipment and used with less demanding applications such as for laboratory needs.

Depending upon the leveling accuracy desired and the response time, the system of the invention may be used with or without the pneumatic isolators having a single chamber, with the electronic damping based on the proximity sensors turned either ON or OFF, with the electronic damping based on the inertial sensors turned either ON or OFF, with the electronic integrators turned either ON or OFF and with or without the feed forward inputs or any combination of the foregoing.

THE SYSTEM

Setup

The system generally comprises the sensors, valve, and associated hardware and a controller which is basically the electronics as shown in FIGS. 3–7.

Figure 1:
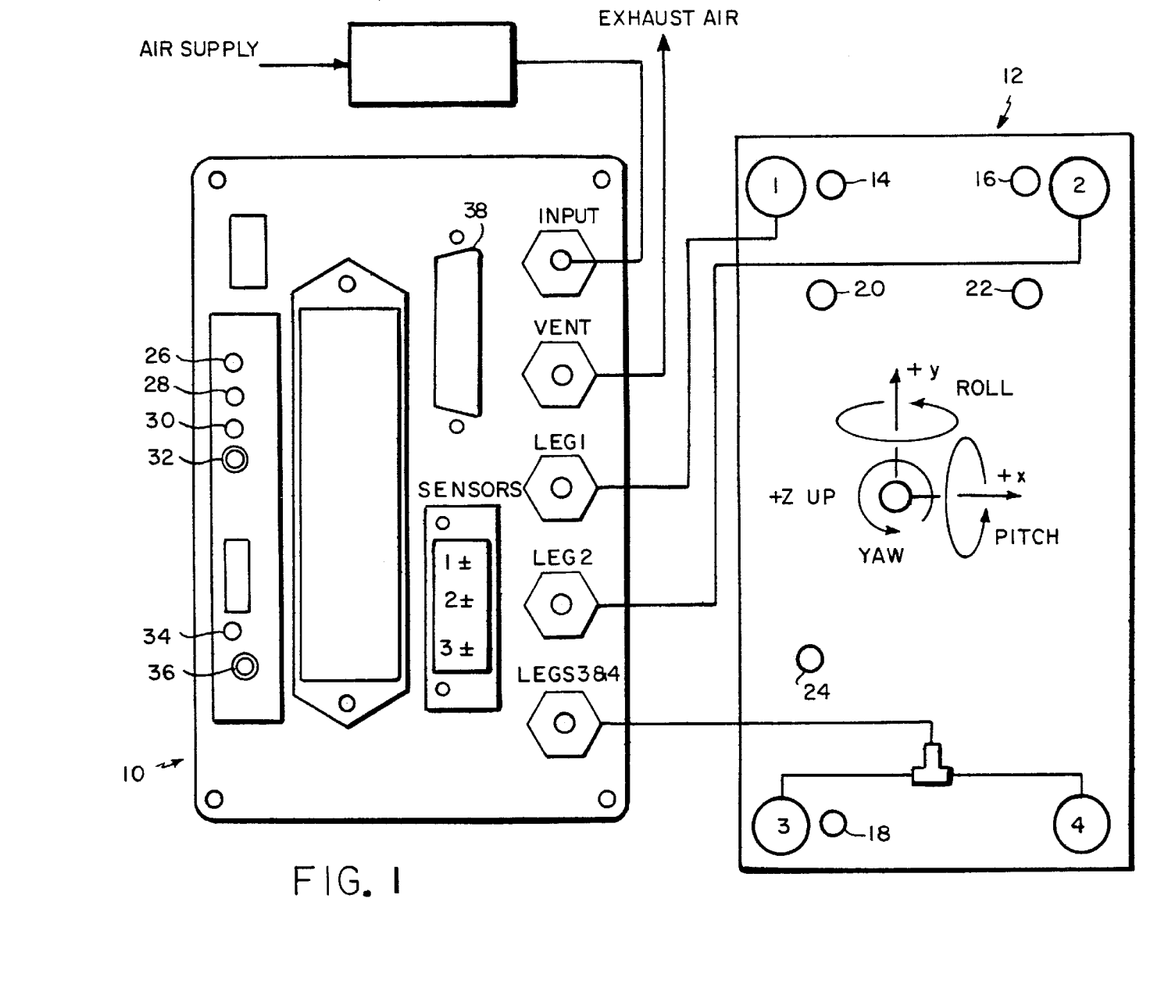
FIG. 1 is an illustration of a vibration-free table used with a system of the invention.

Referring to FIG. 1, a control panel 10 is shown in combination with a platform 12 supported on pneumatic isolators 1, 2, 3 and 4.

In each pneumatic isolator leg 1, 2, 3 and 4, there is a single pneumatic chamber which supports a piston sealed to a rolling diaphragm (not shown). With the single chamber of the invention, the air can be moved more rapidly into and out of the pneumatic isolators providing an improved damping characteristic which is independent of the amplitude of the platform's motion. A standard two chamber pneumatic isolator leg can be used, however, maximum system performance will not be realized in most applications.

Associated with pneumatic isolator leg 1 is a proximity sensor 14, with pneumatic isolator leg 2 a proximity sensor 16 and with, pneumatic isolator leg 3 a proximity sensor 18. The sensors are secured to the isolator legs. For the preferred embodiment, the sensors used are Electromatic Model EI-315 Namur proximity sensors. Other such conventional sensors can also be used to sense the linear motion of the platform.

Geophones 20, 22 and 24, e.g. Mark Products L28LB, are secured to the underside of the platform 12 as shown.

Figure 4:
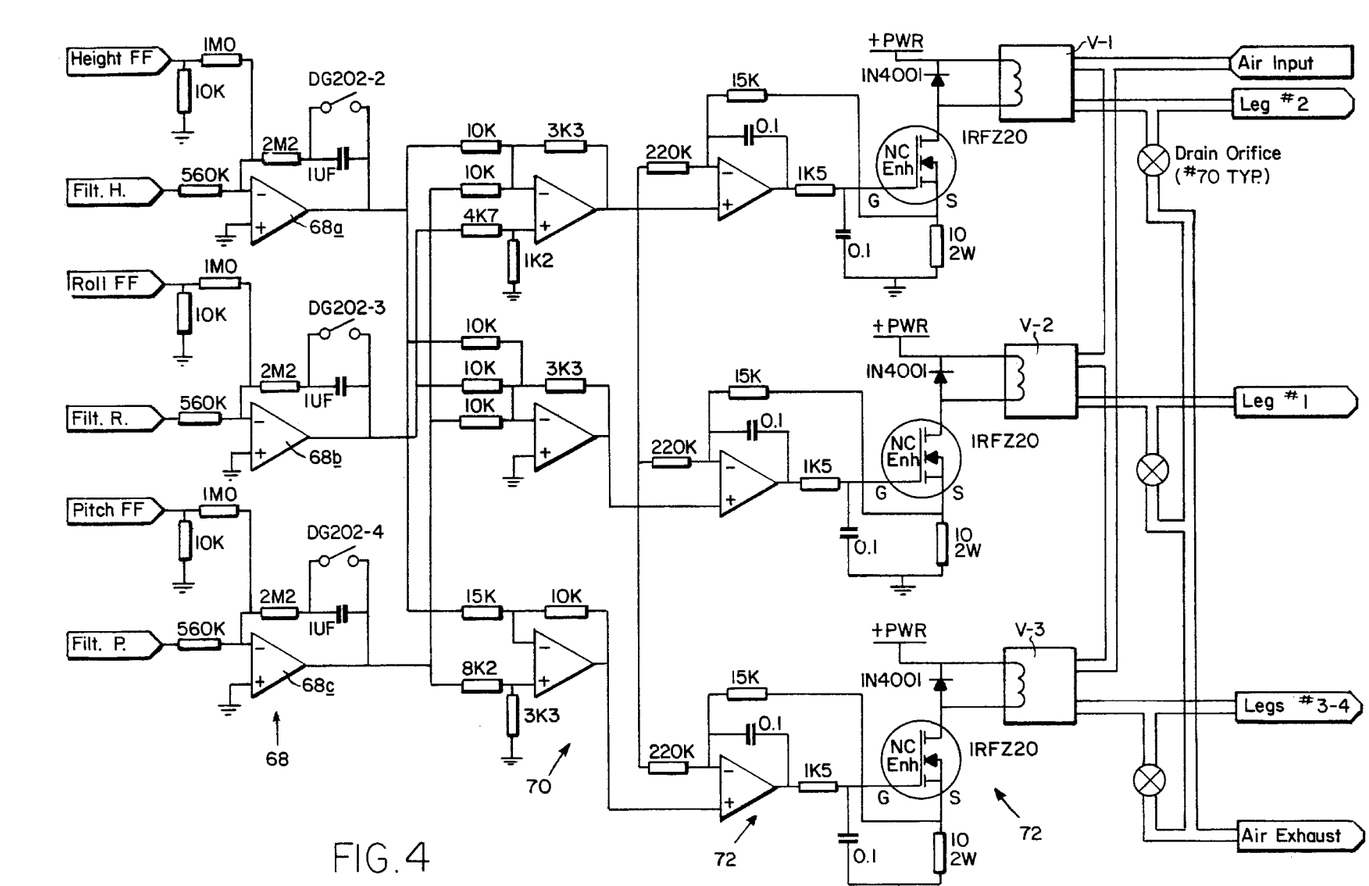

Referring to FIG. 4, servo valves V-1, V-2 and V-3 are illustrated together with the pneumatic flow paths to and from the legs 1, 2, 3 and 4.

The control panel 10 illustrates the pneumatic outputs for the legs 1, 2, and legs 3 and 4 in common. Legs 3 and 4 are coupled. There are five pneumatic inputs and outputs from the controller. Outputs labeled 'LEG 1' and 'LEG 2' communicate directly with the pneumatic isolator legs 1 and 2 at the corresponding corners of the platform 12. The output marked 'LEGS 3 and 4' is connected as shown in FIG. 1.

The gain adjustments for the electronic damping (as will be described) for height, roll and pitch are controlled by potentiometers 26, 28 and 30 respectively. A zeroing ON lamp is shown at 32. The range setting is controlled by a potentiometer 34. Associated with the potentiometer 34 is an out-of-range indicator lamp 36. Also shown at 38 is a DB-25 pinout I/O configured as follows.

TABLE

| | |
|---|---|
| 1) Height f.f. Input | 14) Height Ground |
| 2) Pitch f.f. Input | 15) Pitch Ground |
| 3) Roll f.f. Input | 16) Roll Ground |
| 4) Range OK Logic Output | 17) gnd. |
| 5) Height Analog Output | 18) gnd. |
| 6) Pitch Analog Output | 19) Out of Range Voltage |
| 7) Roll Analog Output | 20) gnd. |
| 8) n.c. | 2i) n.c. |
| 9) Out of Range TP | 22) gnd. |
| 10) n.c. | 23) n.c. |
| 11) n.c. | 24) n.c. |
| 12) +15 Ext. Power Input (750 mA max.) | 25) Ext Power Ground |
| 13) −15 Ext. Power Input (100 mA max.) | |

FIGS. 3–7 comprise the basic electronics of a controller embodying the invention.

Electronic Damping

Figure 3:
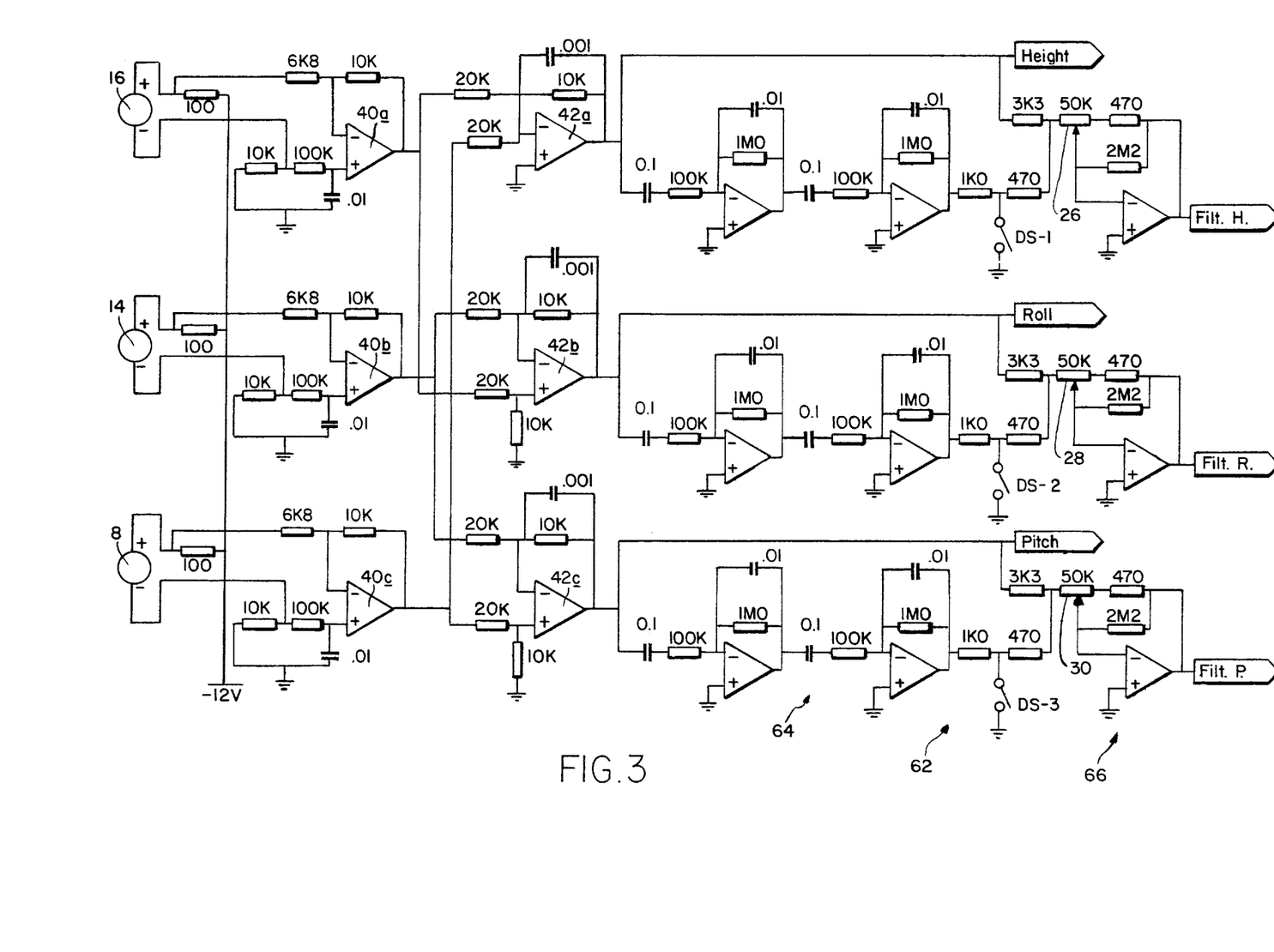
FIGS. 3, 4, 5, 6 and 7 are schematics of a system of the invention.

Referring to FIG. 3, there are three switches DS-1, DS-2 and DS-3 usually set together (to either 'ON' or 'OFF'). The switches allow the controller to electronically damp the platform 12 in height, pitch, and roll by feeding back a force which is proportional and opposite to the platform's velocity based on inputs from the proximity sensors. Using this electronic damping has the added advantage that the leveling portion of the servo (the branch that brings the platform back to its nominal operating height and tilts) can run at a higher gain, and thus react more quickly to payload disturbances. This mode can only be used if the pneumatic isolator's internal damping orifice has been removed to define a single chamber as previously described.

If the internal leg orifices are removed, damping based on the signals derived from the proximity sensors is enabled by setting switches DS-1, DS-3 and DS-3 to the open (off) position. The level of damping is then adjusted for each DOF (height, pitch and roll) by adjusting the associated gain control. If the inertial (geophone) damping is to be used, these switches are set to the closed (on) position, and the level of damping is set by adjusting the gains at amplifiers 107, FIG. 7.

If internal orifices are used in the air isolators, the electronic leveling feature can still be used. The system will still operate, with the same leveling and repeatability precision (though slightly slower than with the electronic damping ON).

There are three electronic gain adjustments. One for height, pitch and roll gain adjustments respectively, see FIGS. 1 and 3. In addition, there is an adjustment for an 'out of range' level, see FIGS. 1 and 5. This latter adjustment is optional. However, the first three are required for successful operation of the system. For these adjustments the controller is most commonly connected to an oscilloscope via the DB-25 connector 38. This type of read-out is well known in the art.

For gain adjustment the potentiometers 26, 28 and 30 are rotated to their fully counter-clockwise position and the controller is actuated. The valves V-1, V-2 and V-3 open to a preset value, e.g. 90% ON and the pneumatic isolators 1, 2, 3 and 4 start to inflate. At these gain settings, the platform will try to float. Each gain is increased one turn at a time. Each adjustment has a 10 turn range to get from one gain extreme to the other. As the gain is increased the platform is disturbed and how the platform settles out is observed in the degree of freedom (DOF) (height, pitch or roll) being adjusted. As the gain increases, the platform will return faster and faster to equilibrium. (If the electronic damping is ON, the damping will gradually improve). At some point, in whatever 'mode' the system is running in, the DOF being adjusted will start to oscillate with a frequency of 4–7 Hz. The gain for that DOF is backed off until the oscillation disappears and the table has a suitable response. (The status of the electronic integrators (ON or OFF) is not important for adjusting these gains).

Out-of-Range

Figure 5:
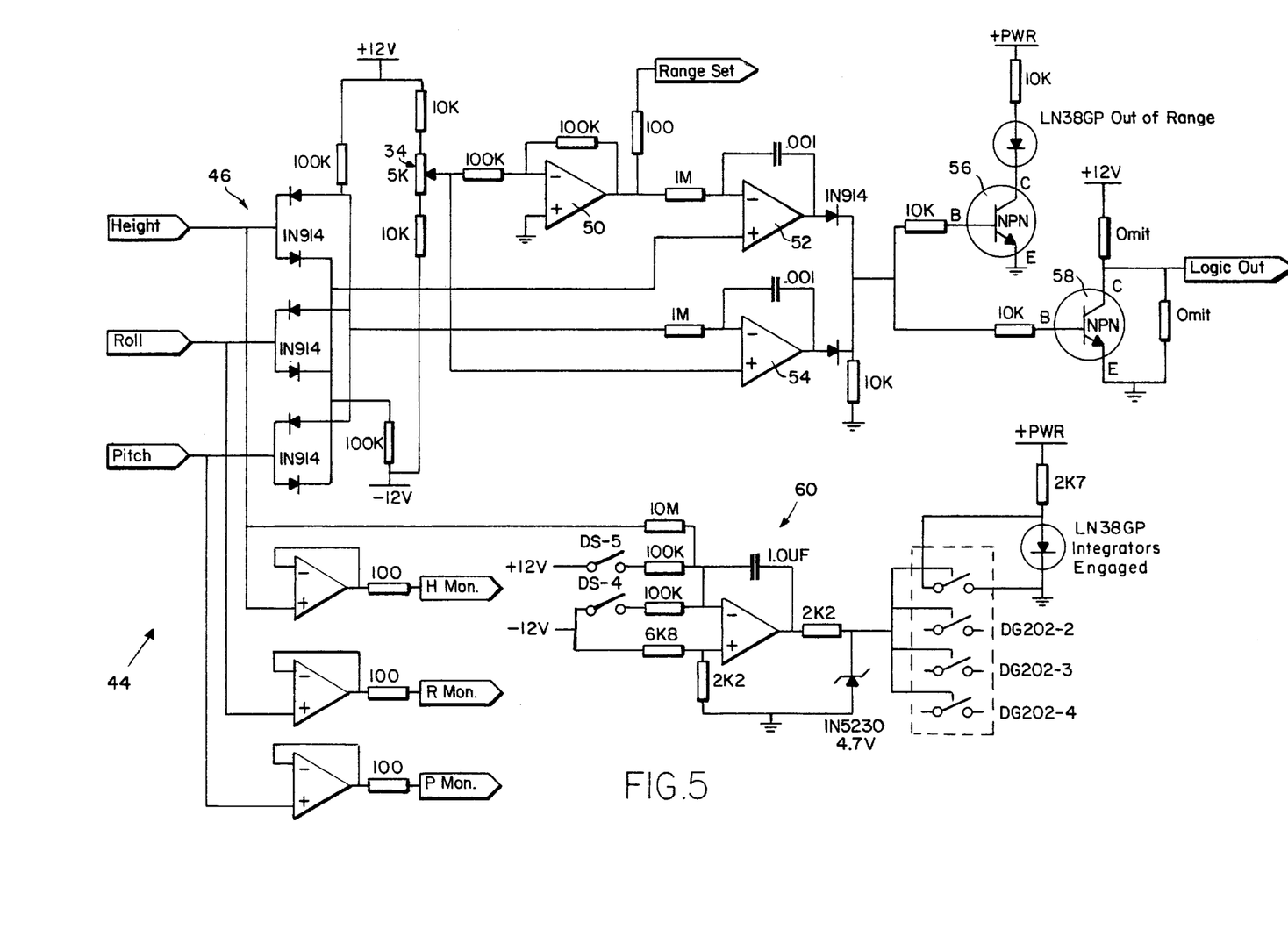

The 'out of range' signal will be displayed when the movement of the platform exceeds preset limits. The potentiometer 34, FIGS. 1 and 5, is adjusted until the red 'RANGE OK' lamp 36 is off where the table is within an acceptable range for the particular application, for example 50 microns. Clockwise rotation of the potentiometer 34 decreases the acceptable window. The threshold window voltage can be measured via the DB-25 connector 38. The system has an open-collector logic output for reading the range status. Specifically the output will go low if the 50 micron (for example) window is exceeded.

Electronic Integrators

The air stages in the system are analogous to a 'class-A' power amplifier, the servo valves nominal operating point is approximately in the middle of their total range of operation. Air flows continuously through the valves into the pneumatic isolators and air is likewise continuously bled from the isolators through a set of fixed orifices. If the system requires that an isolator be pumped up, it increases the flow through the corresponding valve, and the flow rate into the pneumatic isolator then outpaces the exhausting of air through the orifice. Likewise, to deflate a pneumatic isolator, the air flow is decreased. The exact location of this operating point depends on the type of pneumatic isolator being used and the total platform payload. The electronic integrators 68*a*, 68*b* and 68*c*, see FIG. 4, automatically find the operating points and allow the proximity sensor outputs to return to a nominal zero output voltage. Because the electronic zero is also the mechanical zero for the sensors, with the electronic integrators engaged, the platform will return to within micron/microradian of its nominal operating point independent of the payload or its distribution. The integrators can be turned ON or OFF.

There are two reasons for being able to turn the integrators OFF. The first involves setting up the system with tight mechanical travel limits. If during an installation the proximity sensors are installed such that their electronic null is outside of the mechanical limits of the system they are being installed on, the integrators will 'saturate' when the system is turned on. This makes leveling the platform by moving the proximity sensors up and down in their mounts very difficult, due to the integrator's lag in response. Momentarily turning the integrators OFF allows this mechanical adjusting to be done without the bothersome lag introduced by the integrators. Once the height of the proximity sensors is roughly adjusted, and the platform is floating within its mechanical limits, the integrators can be turned ON and a final height adjustment made.

The integrators also affect the response of the platform to a sudden change in the platform payload. When the integrators are used in a feedback loop, the result is that the time integral of the sensor outputs must equal zero. Accordingly, if the table is displaced in one direction, it must overshoot in the opposite direction. Though this overshoot is small, and normally does not add a significant time delay, it can be reduced by running the system in a mode where the integrators are OFF. This comes at a cost of the operating height of the platform being load dependent, and introducing a small hysteresis in the payload of between 10 and 100 microns/microradians. For many applications, neither of these is a significant problem. Of important note is that the 'time integral' rule can be broken by using the feed-forward inputs provided by the system. These inputs are added to the sensor signals before the electronic integrators, and can thus be used to null out the overshoot. In practice, this is most useful for applications (such as semiconductor inspection machines) where a moving stage is being controlled by a computerized controller which can also provide the appropriate feed-forward signals to the system for the stage motion being performed.

The status of the integrators is controlled by an analog switch, such as a Siliconix DG-202. To enable the integrators, both the switches at the input of amplifier 60 are left open. In this configuration, the integrators are electronically shut off until the system senses that the payload is floating (the isolators are inflated). Once floating, and after a few second delay, the electronic switches at amplifiers 68, FIG. 4, are opened and the integrators thus enabled.

Operation

Figure 2A:
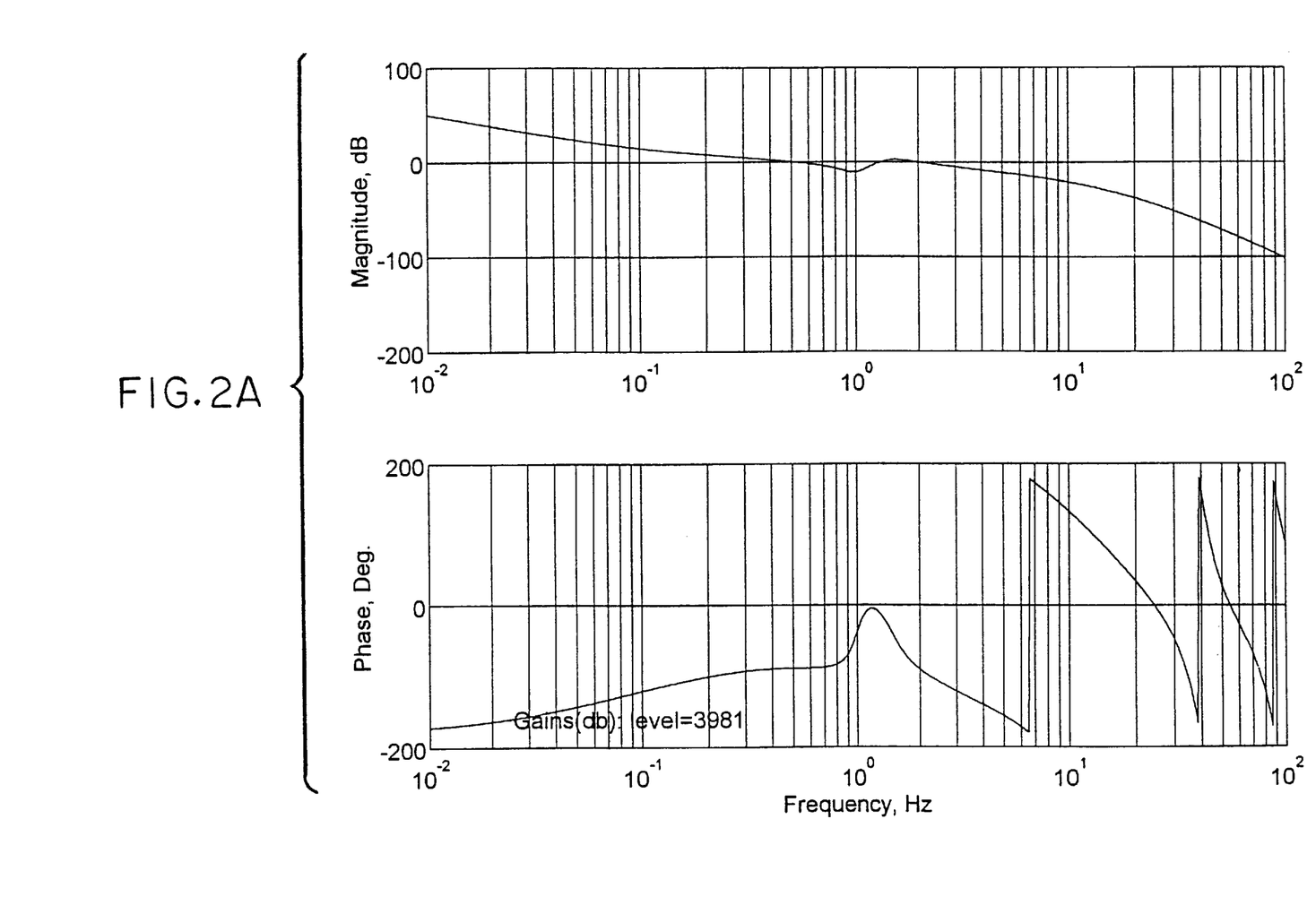
FIG. 2a is a calculated graph of a loop transfer function (senors-electronic filters-valves-table)
Figure 2B:
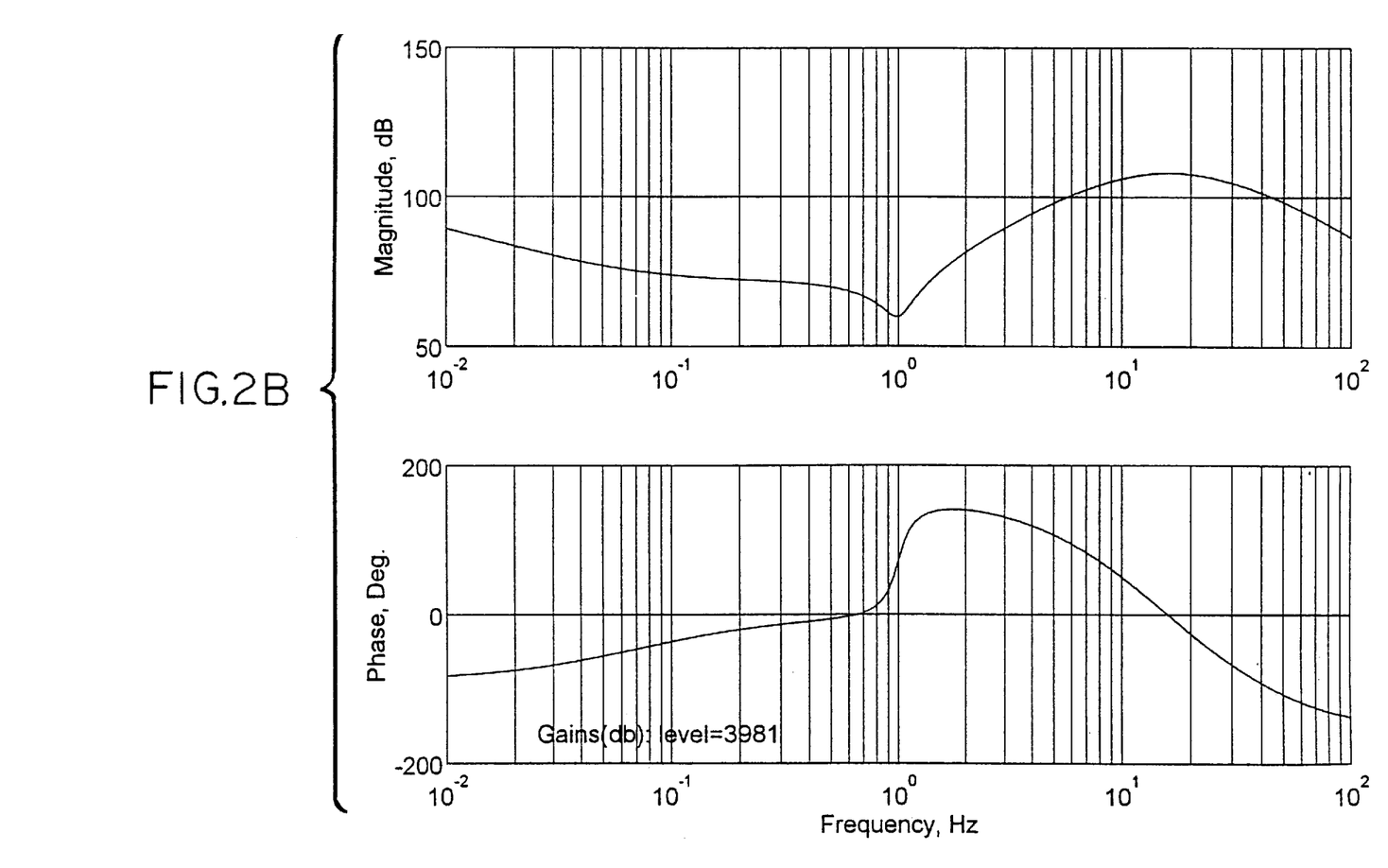
FIG. 2b is a calculated graph of the electronics transfer function.
Figure 2C:
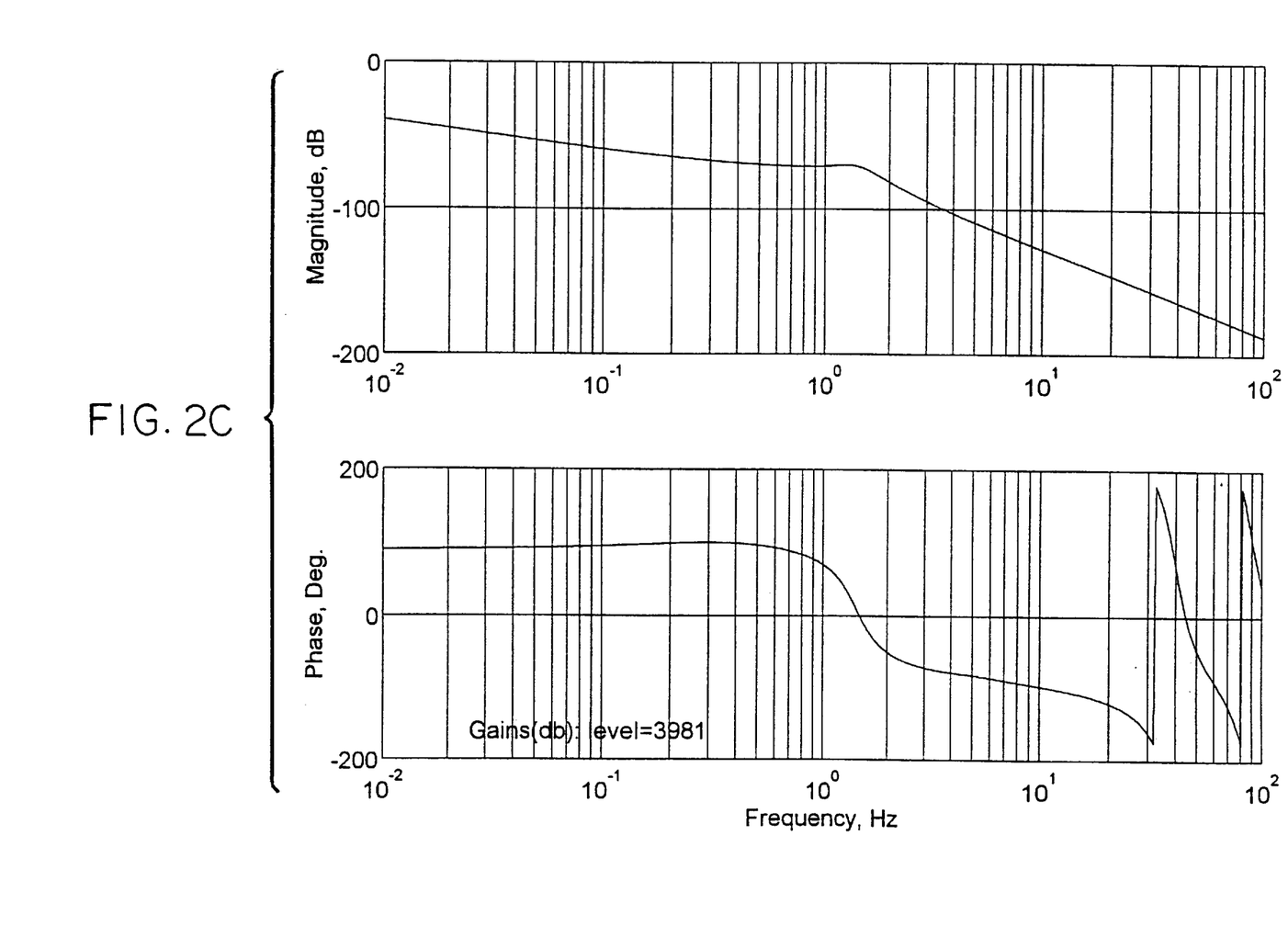
FIG. 2c is an idealized model of a typical plant transfer function (valve-table)

The leveling accuracy of the preferred embodiment of the system is typically less than one micron (height) and less than one microradian (pitch and roll). The leveling hysteresis is less than one micron per microradian (integrators on) and less than fifty microns/microradians (integrators off). The proximity sensor gain, with the sensors of the preferred embodiment, is 2 V/mm. The signal processing is frequency dependent, and in the preferred embodiment, the system is designed for a platform with a resonance between 1 and 3 Hz. The valves control the air flow into the isolators and do not directly position the isolators. The effect is for the amplitude of motion of the platform to decrease like $f^{-1}$ (f being frequency) for a constant-amplitude signal to the valves which is increasing with frequency for signals below the tables resonant frequency. FIGS. 2a, 2b and 2c show the response of the platform to a fixed amplitude valve signal vs. frequency; the electronics frequency response and the resulting loop transfer function for the system servo (only one DOF shown). Above the resonant frequency of the platform, this becomes steeper with a $f^{-3}$ response. If the system is minimal phase, then the steepest a servo loop transfer function can be at its unity-gain frequencies is $f^{(+/-)2}$. For a servo to have a well-behaved resonance, a 'slope' of $f^{(+/-)1}$ is common. Therefore, for the system to be able to control the platform's resonance (which requires the servo to have greater than unity-gain at the table resonance), the steep $f^{-3}$ response of the valve/platform combination must be filtered. A double-differentiator in the frequency region of the table resonance decreases this slope from $f^{-3}$ to $f^{-1}$ allowing for a stable and well-behaved response at the unity-gain frequency. At frequencies above the unity gain frequency of the servo the differentiator is disabled to prevent excessive noise feedback in the system (16 Hz in the preferred embodiment).

At low-frequencies the $f^{-1}$ slope of the valve/platform transfer function is already suitable for feedback. An electronic integrator brings the platform to such a height that all the position sensors monitoring the platform's position are returned to a nominal 'zero' output. This integrator increases the slope of the transfer function by one power of frequency. Thus it should be added at a frequency were the servo is operating at a gain not near unity-gain (either above or below unity-gain). In the preferred embodiment of the invention, the integrators are effective below 0.1 Hz and the system has three unity-gain frequencies: two within one Hz of the platform resonance frequency, and a third roughly at ¼ the platform resonance frequency.

The foregoing specifications are illustrative of the preferred embodiment of the invention and are for exemplary purposes only.

The operation of the invention will be described with reference to the electronic damping actuated based on the conditioned signals from the proximity sensors, FIG. 1. The electronic integrators actuated and single chamber pneumatic isolators.

The outputs from the proximity sensors 14, 16 and 18 are processed sequentially through several stages to produce a signal appropriate for controlling the system's three (in the preferred embodiment) proportional valves. Though the preferred embodiment has three sensors and three valves, there is not a one-to-one relationship between them. Rather, the signals are 'mixed' and 'unmixed' appropriately to produce signals in the main filtering stages corresponding to the three orthoganol degrees-of-freedom (DOFs) of the platform (height, pitch and roll). This facilitates both gain adjustments and allows a single feed-forward signal to be introduced to control each DOF. The proximity sensor signals are processed as follows.

Referring to FIG. 3, the first three amplifiers 40a, 40b and 40c are trans-conductance amplifiers which convert the variable-resistance output of standard NAMUR proximity sensors such as Electromatic EI-3015 into bipolar analog signals with an approximate range of ±8 v, with zero output volts being the designed operating point. The values of the resistors in these amplifiers are also chosen to produce the optimum linearity for the sensors.

The next three amplifiers 42a, 42b and 43c take the signals from the three amplifiers 40a, 40b and 40c and mix them to produce signals representing the HEIGHT, PITCH and ROLL degrees of freedom of the platform. These signals are then used for several purposes.

Referring to FIG. 5, they are buffered by a set of voltage followers and provided to the user as reference signals H MON, R. MON and P MON. Each of the signals is also monitored for use in an out-of-range detection circuit. This portion of the circuit combines each of the three signals through a set of six diodes, shown generally at 46. These diodes combine the signals such that the voltages produced at the 'far' side of the diodes represent the highest of the three voltages (−) a diode voltage drop (typ. 0.6 v), and the lowest of the three voltages (+) a diode voltage drop. The next three amplifiers shown generally at 48 form a 'slow' voltage window comparator: The potentiometer 34, FIG. 1, generates a fixed voltage range which is inverted by amplifier 50. Amplifiers 52 and 54 then compare these fixed voltages with the aforementioned (+/−) limit voltages. These amplifiers (comparators) are in the form of integrators, which prevent electronic noise from triggering false out-of-range indications, and prevent any 'window violation' shorter than about ⅒ of a second from being indicated. Two transistors 56 and 58 follow. The transistor 56 drives an LED lamp indicating the out-of-range status. The transistor 58 can provide either a open-collector or TTL logic output to provide an electronic 'status OK' indication.

The HEIGHT output is also used to control the status of the electronic integrators described below. Here, the HEIGHT signal is compared by a very slow integrator 60 to a fixed voltage representing a platform which is a few millimeters too low. If the platform is below this reference 'height', then the electronic integrators are disabled. Once the platform floats above this reference 'height', the integrator will slowly change its output voltage such that after a few seconds the integrators will be turned on (by opening the analog switches DG-202 2–4). A fourth switch DG-202-1 is used to turn on a lamp indicating that the integrators have been engaged. Two switches DS-4 and DS-5 are optionally available to place the integrators into either an 'always ON' or 'always OFF' mode.

Referring to FIG. 3, the height, pitch and roll signals are also processed by three identical filters 62 for use in the main feedback loops. Each of these filters 62 is formed by adding a proportional (unfiltered) bypass to a double-differentiator/integrator 64. This produces a transfer function which is flat (proportional) from DC to approximately 1 Hz. From 1–10 Hz the filter looks like a double-differentiator which allows the gain of the servo to go above unity-gain at the platform's primary resonance(s) which are also in this frequency range. Above 10 Hz the filter rolls over to become a double integrator, and above 300 Hz the filter is once again dominated by the proportional (unfiltered) bypass. The double-differentiator/integrator output is combined with the proportional bypass at the input of a pseudo-log amplifier gain stage 66. This stage combines the two with the appropriate ratio.

The double differentiator/integrator 64 can be turned OFF by closing switches DS-1, DS-2 and DS-3. The double differentiator/integrator can be turned OFF in the case that the system is used with two chamber isolators—in which case the servo can not be brought above unity-gain at the platforms resonance(s). If the double differentiator/integrator 64 are disabled, the gain of the proportional branch is boosted by about 6 db. The double differentiator/integrator 64 are turned OFF when the geophones are used as described hereinafter.

Referring to FIG. 4, the signals from the pseudo-log amplifiers 66 are sent to a set of low frequency integrators 68. These serve two purposes. First, they provide a point in the circuit to add feed-forward signals for the height, pitch and roll DOFs. Adding these signals after the adjustable-gain amplifiers ensures that feed-forward control of the circuit will be unaffected by changes in the gain settings. The second function of these amplifiers is to provide electronic integrators below 0.1 Hz. The purpose here is to take the three sensor outputs and integrate them until the integrator outputs are appropriate to bring the valves to their operating point. For example, with a vertical displacement of the platform 12 produces a 'DC' offset in the height branch of the servo filters. This offset is amplified by the adjustable-gain amplifier and introduced to the input of the integrator 68a. The output of the (height) integrator will slowly increase or decrease (depending on the sign of the platform deflection).

The output of this integrator 68a is fed into an 'un-mixing' matrix 70 which provides each of the three valve drivers with signals of equal magnitude and sign (with the exception of valve three—which is given a signal twice as large for reasons described below). These three signals then actuate all three valves in a manner to either increase or decrease the flow of air to the platform's legs, changing the platform's height such that the output of the sensors is brought closer to zero volts output. This feedback continues until the output of the sensors (and therefore the height of the platform) is brought to zero volts—the normal operating point for the system. At this point, the height integrator's voltage stops its increasing (or decreasing) and it maintains a DC offset appropriate for maintaining the platform height. Similar feedback occurs for the pitch and roll DOFs as well. The status of these integrators is controlled by the signal monitoring portion of the circuit as described above. Above 0.1 Hz, the integrators roll off to a proportional response, appropriate for a unity-gain for the servo between 0.1 and 1 Hz, as is obvious for one trained in the art.

The amplifiers 70 following the three integrator stages re-mix the signals appropriate for controlling the valves. Namely, a positive deflection in height causes a decrease in the control signal for all three valves. A positive pitch deflection causes a decrease in the valves controlling legs 1 an 2, and causes an increase in the control signal to the valve controlling legs 3 and 4. Likewise, a positive roll deflection causes an increase in the signal to the valve controlling leg 2, and a decrease in the signal controlling valve 1. For roll, the valve for legs 3 and 4 is unchanged, since a roll will simply cause air to flow from leg 3 to 4 (or visa-versa) through the tube connecting them, but there is no need for a net change in the legs' air pressure. Note that the gain for the amplifier controlling valve 3 is twice that of the other two amplifiers. This is due to the fact that valve 3 is controlling two legs in tandem, and thus must move twice as much air to affect the same displacement as either valves 1 or 2—each of which only controls one leg.

Following the de-mixing stage 70 is a set of amplifiers 72 and transistors 74 for controlling the valve currents. The valves V1, V2 and V3 produce a flow rate which is proportional to the electrical current energizing their coils. Since this is what needs to be controlled, these driver stages monitor the coil current by observing the voltage drop across a drain resistor. That voltage is compared with the driving voltage, and is integrated until the valve current accurately reflects the command voltage from the de-mixing matrix. A resistor/capacitor combination prevents high-frequency noise from being amplified by the driving transistor. A diode prevents high voltages from being generated on the valve's coil which might damage the circuit.

Figure 6:
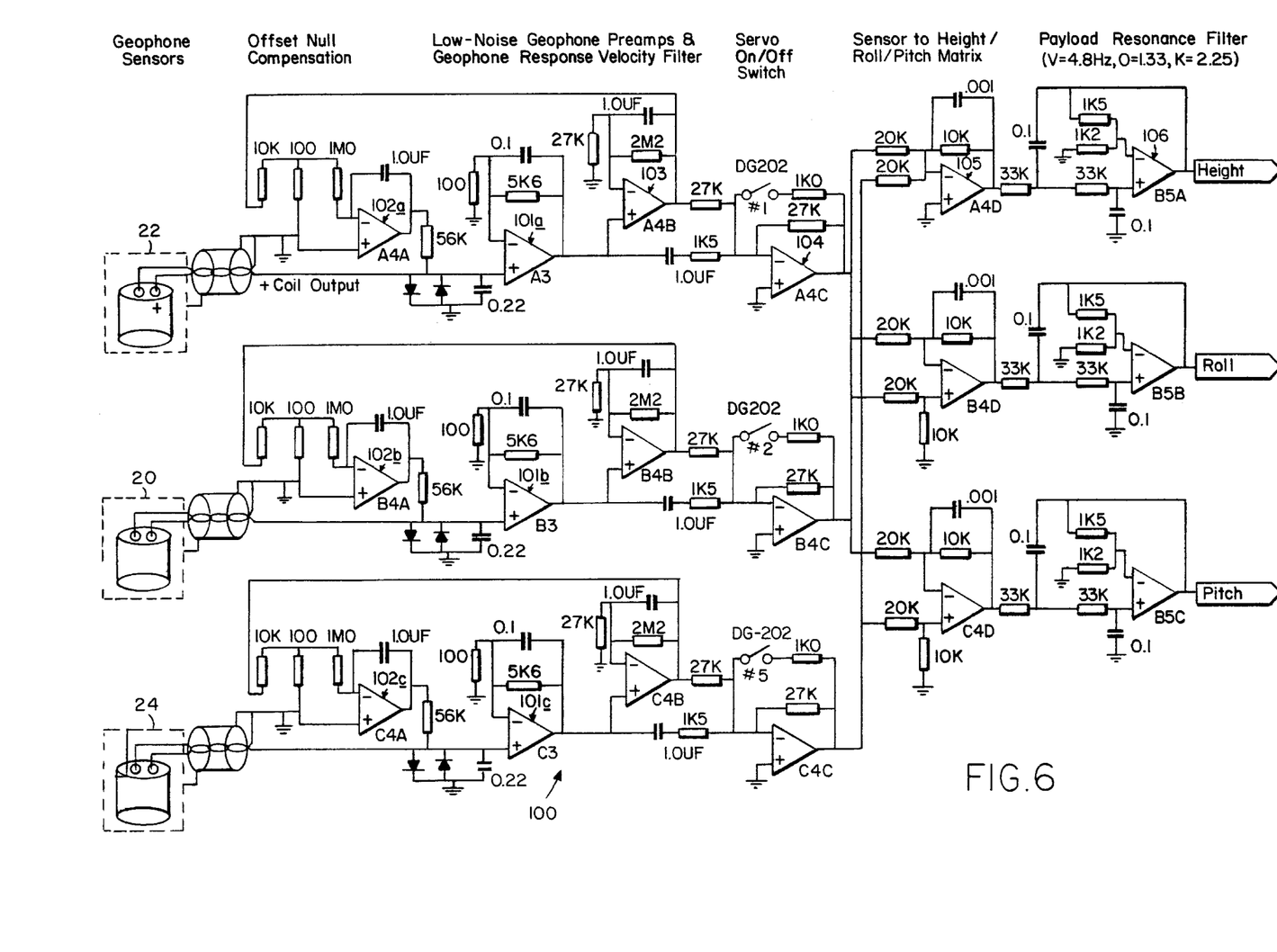
Figure 7:
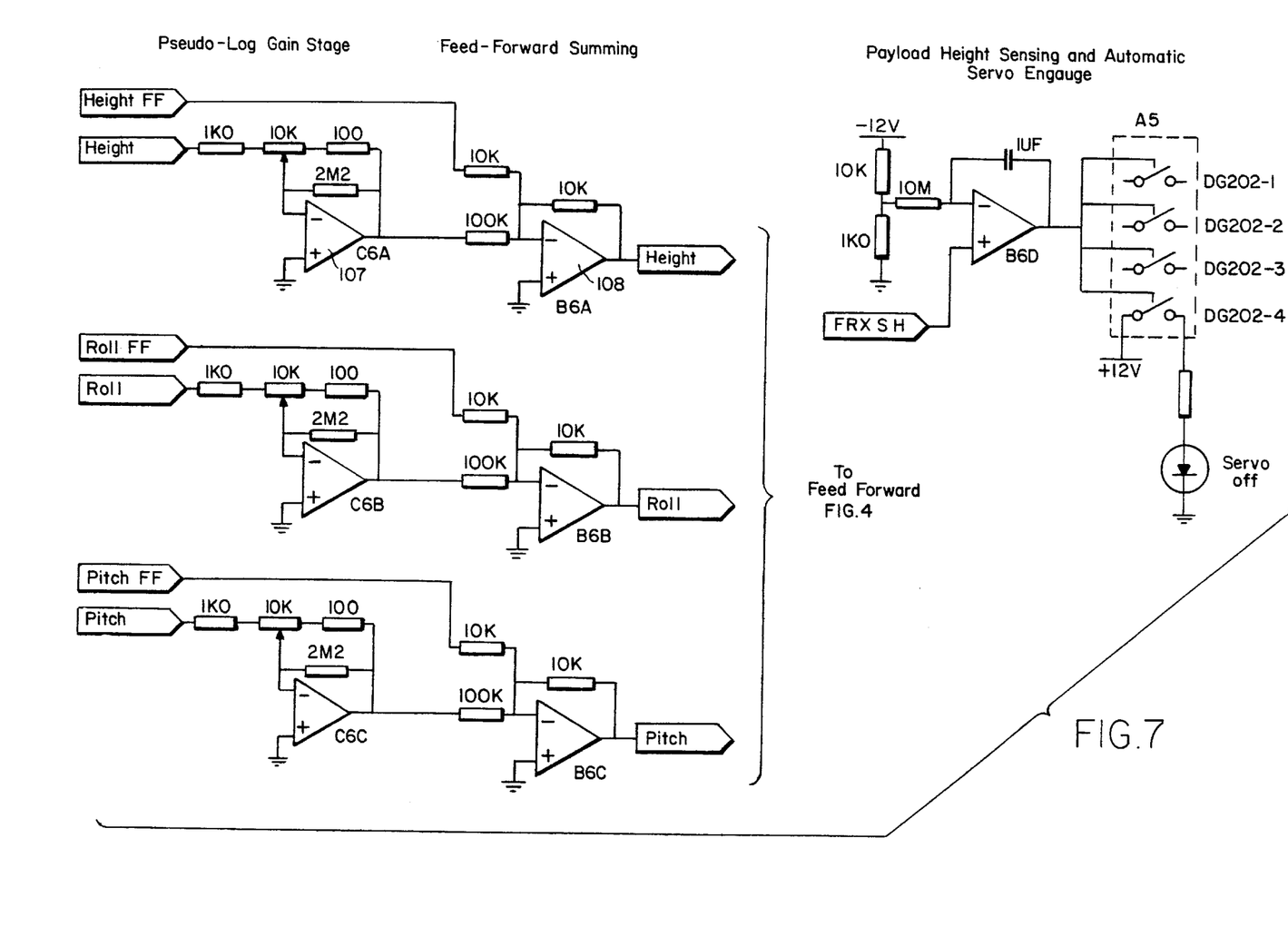

FIGS. 6 and 7 show an alternate circuit for damping the platform using inertial sensors (geophones). These measure the velocity of the platform with respect to an internal inertial proof mass, and thus provide a means to damp the platform without introducing noise from floor motion as is the case when the platform's velocity is derived from floor-mounted proximity sensors.

The expected use of the vibration isolation system will determine which damping system is more appropriate. The low-level output from the three geophones is communicated to the geophone filter box via three twisted-shielded-pair cables. The negative wire from each geophone is grounded, along with a wire to the geophone case (the cable shield). The positive geophone output is coupled through two back-to-back diodes and a capacitor to ground. The diodes protect the input amplifier from being damaged by high-g impacts to the geophones, and the capacitor serves to filter out excess high-frequency noise. The positive lead is connected to the (+) input of a low-noise amplifier 101 (such as an OP25), and to the output of a second amplifier 102 through a resistor. The first amplifies the geophone output by approximately 50 x, and the second. adds an input bias offset current. The latter is required because the circuit has a high DC gain—on the order of 60 db. This causes small DC amplifier offsets to be amplified to undesirably high levels at the filter chain's output. To prevent this, this second amplifier monitors the output of the filter chain. DC offsets at the chain's output are fed back to the input of the chain to form an automatic DC nulling circuit. This works by feeding a small DC current through the geophones themselves. Since the coil of the geophones has a resistance of 630 ohms, this current turns into an apparent DC voltage on the geophone outputs—of the correct magnitude and sign to null out any DC offsets at the end of the filter chain.

The filter chain consists of two amplifiers following the 50 x low-noise amplifier. The first is a phase-lag amplifier with a lower corner at 0.1 Hz, and an upper corner at 6 Hz This is summed with a high-pass filter with a 100 Hz corner frequency. The second amplifier also has a selectable gain which is controlled by an analog switch (DG202) described below. The transfer function of this filter chain is flat below 0.1 Hz, the gain decreases with one power of frequency to 6 Hz, where it turns around and increases with one power of frequency to 100 Hz, above which the filter is again flat. The 6 Hz corner frequency is designed to coincide with the geophone's resonant frequency. When the geophone is filtered through this chain, the result is a signal which represents the acceleration at the point where the geophone is mounted, for frequencies between 0.1 and 100 Hz.

The next set of amplifiers 105 is a matrix which converts the signals derived from these geophones into height, pitch and roll. accelerations. The reason for this is to make this circuit's output compatible with the height, pitch and roll feed-forward inputs of the embodiment described in FIGS. 3, 4 and 5. The next. set of amplifiers 106 in the chain provide a second-order low-pass filtering of the signals, with a corner frequency at 50 Hz. The purpose of this filter is to avoid resonances in the platform (typically in the 100–200 Hz range) from causing instabilities in the servo. Referring to FIG. 7, the next set of amplifiers 107 are pseudo-log gain stages, for adjusting the overall loop gains (a known procedure in servo design). The final amplifier stages 108 adds in a user-provided feed forward input. This recovers the feed-forward inputs of the basic circuit, FIG. 4, which are used by this circuit (the only difference being a sign change).

The last portion of the circuit monitors the height signal from the basic circuit, FIG. 3, and only turns the servo 'on' once the platform is 'floating'. This is done by integrating the difference between the analog height output of the basic circuit and a fixed reference voltage. Once the platform is floating, the integrator ramps from a positive saturation condition to a negative saturation. When the voltage drops below the input threshold for the DG202, the switches open, and the circuit jumps to its full gain condition. The fourth switch in the DG202 is used to drive a red LED indicating the servo is 'OFF'.

When the circuit of FIGS. 6 and 7 is used, the electronic damping in the basic circuit, FIG. 3, must be turned OFF and the gain settings reduced. This is because the geophones now perform the damping function rather than the proximity sensors. The advantage of this is that the geophones offer an inertial reference for the platform, whereas the proximity sensors monitors the platform motion relative to the floor. The result is that the geophone sensors improve the vibration transfer characteristics of the platform (the proximity sensor based damping degrades the vibration isolation performance).

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A positioning system for use with pneumatic isolators which support and position a platform having valves which are in communication with the isolators and at least three sensors which are in communication with the platform to provide output signals corresponding to the position of the platform which system comprises:
    means for combining the output signals from the sensors to provide a plurality of distinct position signals corresponding to the position of the platform regarding its height, roll and pitch;
    means for conditioning said position signals to provide conditioned frequency dependent signals corresponding to each of said position signals for controlling the position and the damping of the platform;
    means for decombining said frequency dependent signals to provide control signals; and
    means for outputting the control signals to the valves both to maintain the platform in a null condition regarding its height, pitch and roll and to dampen the platform motion with respect to height, pitch and roll.

2. The system of claim 1, wherein said means for conditioning comprises:
    a plurality of proximity sensor control path compensators each uniquely associated with one of said position signals, wherein each of said compensators includes,
        a second order differentiator which conditions said associated position signal to provide a filtered signal; and
        a summer, which sums said filtered signal with said associated position signal to provide a compensated signal.

3. The system of claim 2, wherein each of said plurality of compensators comprises:
    an integrator, responsive to said associated compensated signal, to provide one of said conditioned frequency dependent signals.

4. The system of claim 3 wherein the sensors are proximity sensors, and said means for combining includes:
    means for mixing the output signals from the proximity sensors, and for providing said plurality of distinct position signals indicative of pitch, height, and roll.

5. The system of claim 4 wherein said plurality of compensators includes:
    a roll compensator, responsive to said distinct position signal indicative of roll;
    a height compensator responsive to said distinct position signal indicative of height; and
    a pitch compensator responsive to said distinct position signal indicative of pitch.

6. The system of claim 3, further comprising:
    signal conditioning and filtering circuitry responsive to a plurality of geophone signals each from one of a plurality of geophone sensors mounted to the platform, wherein said circuitry provides a plurality of filtered geophone signals each uniquely associated with one of said geophone sensors;
    mixing circuitry that processes said plurality of filtered geophone signals to provide a plurality of distinct geophone signals indicative of dynamic platform motion regarding platform pitch, roll and height;
    a plurality of geophone control path compensators each uniquely responsive to one of said geophone signals, wherein each of said geophone control path compensators includes
        i) filtering means responsive to its associated geophone signal, for providing a filtered geophone signal; and
        ii) a summer which sums said filtered geophone signal with an associated said gain corrected compensated signal to provide a summed signal which is input to an associated one of said integrators;
    wherein said second order differentiator is disabled, such that said compensated signal is equal to said associated position signal.

7. The system of claim 3, further comprising:
    means for receiving a plurality of feedforward signals, each uniquely associated with one of said position signals, wherein each of said summers of said proximity sensor control path compensators sums said associated position signal, said associated filtered signal and said associated feedforward signal to provide said compensated signal.

8. The system of claim 6, further comprising:
    means for receiving a plurality of feedforward signals, each uniquely associated with one of said position signals, wherein each of said summers of said proximity sensor control path compensators sums said associated position signal and said associated feedforward signal to provide said compensated signal.

9. A positioning system for use with pneumatic isolators which isolators support and position a platform having valves which are in communication with the isolators and at least three position sensors which are in communication with the platform to provide output signals corresponding to the position of the platform which system comprises:

means for processing the output signals from the sensors to provide position signals corresponding to the position of the platform;

means for processing the position signals to provide control signals;

means for outputting the control signals to the valves to maintain the platform in a null condition; and wherein said means for processing the position signals includes a dynamic compensator which processes the position signals along two parallel paths including (i) a dynamic path which includes a second order differentiator and (ii) a proportional path, wherein the outputs of said dynamic path and said proportional path areas summed to provide a summed value which is integrated and domain transformed to provide said control signals.

10. The system of claim 9, further comprising:

means for receiving a plurality of feedforward signals, each uniquely associated with one of said position signals, wherein the outputs of said dynamic path and said proportional path are summed with an associated one of said feedforward signals to provide said summed value.

11. A positioning system for use with pneumatic isolators which isolators support and position a platform having valves which are in communication with the isolators, comprising:

at least three proximity sensors which are in communication. with the platform to provide sensed signals corresponding to the position of the platforms;

means for processing the sensed signals to provide position signals corresponding to the relative position of the platform;

means for processing the position signals to provide control signals, including a compensator comprising a plurality of parallel processing paths, each responsive to the position signals, including a first path having a second order differentiator, and a second path having a gain, wherein the outputs of the plurality of paths are summed to provide a summed value which is integrated and domain transformed to provide the control signals; and means for outputting the control signals to the valves.

12. The system of claim 11, further comprising:

means for receiving a plurality of feedforward signals, each uniquely associated with one of said position signals, wherein the outputs of the plurality of paths are summed with an associated feedforward signal to provide said summed value.

13. A method for maintaining a platform in a null condition with a positioning system which includes pneumatic isolators that support and position the platform, valves in communication with the isolators and at least three sensors which are in communication with the platform to provide output signals corresponding to the position of the platform which comprises the steps of:

combining the output signals from the sensors to provide three distinct position signals corresponding to the position of the platform regarding its height, roll and pitch;

conditioning each of said position signals with a compensator having a second order differentiator to provide conditioned frequency dependent signals for positioning and damping the motion of the platform;

decombining said conditioned frequency dependent signals to provide control signals; and outputting the control signals to the valves to maintain the platform in a null condition regarding its height, pitch and roll.

14. The method of claim 13, wherein said step of conditioning includes a step of integrating which provides said conditioned frequency dependent signals.

15. The method of claim 13, further comprising the steps of:

receiving a plurality of feedforward signals each uniquely associated with one of said position signals;

filtering each of said position signals with said second order differentiator to provide filtered position signals;

summing associated said feedforward signals with associated said filtered position signals to provide summed signals; and integrating each of said summed signals to provide said conditioned frequency dependent signals.

16. The method of claim 13 which further comprises the steps of:

sensing the motion of the platform with an inertial proof mass referenced to the platform and outputting signals corresponding thereto;

conditioning the signals generated from the sensed motion to provide damping signals;

wherein said step of conditioning each of said position signals includes the steps of i) disabling said second order differentiator;

ii) summing the signals from said compensator with said damping signals to provide summed signals; and iii) integrating said summed signals to provide said conditioned frequency dependent signals.

17. positioning system for use with pneumatic isolators which support and position a platform having valves which are in communication with the isolators, the system comprising:

A) a first controller responsive to a plurality of position signals indicative of platform position and used to control the platform position, wherein said first controller comprises, A1) means for processing said plurality of position signals, and for providing a plurality of first signals indicative of platform position in pitch, roll and height;

A2) a plurality of gain compensators each uniquely associated with an associated one of said first signals, to provide a plurality of first controller compensated signals;

B) a second controller responsive to a plurality of geophone signals, said geophone signals used to dampen the platform motion, wherein said second controller comprises, B1) signal conditioning circuitry including an inverse matched geophone filter responsive to said geophone signals, that provides a plurality of second signals indicative of platform acceleration in pitch, roll and height;

B2) a plurality of second control path compensators, each uniquely associated with an associated one of said second signals, each of which compensator provides one of a plurality of second controller compensated signals; and C) means for combining signals indicative of said associated plurality of first controller compensated signals with said associated plurality of second controller compensated signals, and for processing said combined signals to provide a plurality of valve control signals both to maintain the platform in a null condition regarding its height, pitch and roll and to dampen the platform.

18. The system of claim 17, wherein said first position signals are associated with a plurality of proximity sensors, and said plurality of second signals are associated with said geophone sensors.

19. The system of claim 18, wherein said means for processing comprises, a plurality of integrators each uniquely responsive to an associated one of said summed signals, and each of which provides an integrated summed signal;

means for decombining said integrated summed signals to provide control signals; and means responsive to said control signals, for outputting said valve control signals to the valves to maintain the platform in a null condition regarding its height, pitch and roll.

20. A method for use with pneumatic isolators to support and position a platform having valves which are in communication with the isolators, the method comprising the steps of:

receiving a plurality of position signals indicative of platform position;

processing said plurality of position signals, and providing a plurality of first signals indicative of platform position in a pitch, roll and height;

processing each of said first signals with an associated one of a plurality of first control path compensators each uniquely associated with an associated one of said first signals, to provide a plurality of first controller compensated signals;

receiving a plurality of geophone signals, said geophone signals used to dampen the platform motion;

signal conditioning each of said geophone signals with an associated one of a plurality of inverse matched geophone filters that provide a plurality of second signals indicative of platform acceleration in pitch, roll and height;

processing each of said second signals with a plurality of second control path compensators each uniquely associated with an associated one of said second signals, to provide a plurality of second controller compensated signals; and combining signals indicative of said associated plurality of first controller compensated signals with signals indicative of said associated plurality of second controller compensated signals, and processing said combined signals to provide a plurality of valve control signals both to maintain the platform in a null condition regarding its height, pitch and roll and to dampen the platform.

21. The method of claim 20, wherein said first position signals are associated with a plurality of proximity sensors, and said plurality of second signals are associated with said geophone sensors.

22. The method of claim 21, wherein said step of processing said combined signals comprises the steps of integrating each of said combined signals to provide integrated signals;

decombining said integrated signals to provide said valve control signals; and outputting said valve control signals to the valves to maintain the platform in a null condition regarding its height, pitch and roll.

23. The method of claim 22, further comprising the steps of:

receiving a plurality of feedforward signals, each uniquely associated with one of said position signals, wherein said step of combining includes the step of summing of said associated plurality of first controller compensated signals with signals indicative of said associated plurality of second controller compensated signals and said associated feedforward signals to provide said combined signals.

* * * * *